United States Patent [19]

Finch

[11] 3,893,033

[45] July 1, 1975

[54] APPARATUS FOR PRODUCING TIMING SIGNALS THAT ARE SYNCHRONIZED WITH ASYNCHRONOUS DATA SIGNALS

[75] Inventor: DeVer C. Finch, Phoenix, Ariz.

[73] Assignee: Honeywell Information Systems Inc., Phoenix, Ariz.

[22] Filed: May 2, 1974

[21] Appl. No.: 466,115

[52] U.S. Cl. .................. 328/63; 307/208; 307/222; 307/269; 328/44; 328/72; 328/179

[51] Int. Cl.[2] ........................ H03K 1/17; H03K 5/13

[58] Field of Search ...... 307/208, 222, 269; 328/44, 328/62, 63, 72, 74, 179; 178/69.5 R

[56] References Cited

UNITED STATES PATENTS

| | | | |
|---|---|---|---|
| 3,247,491 | 4/1966 | Du Vall | 307/269 |
| 3,453,551 | 7/1969 | Haberle | 328/63 |
| 3,851,257 | 11/1974 | Bogrsma | 328/179 |

*Primary Examiner*—Stanley D. Miller, Jr.
*Attorney, Agent, or Firm*—Edward W. Hughes

[57] ABSTRACT

Apparatus which includes a pair of inverters, a NOR-gate and three up/down counters is connected to a source of asynchronous data signals and a source of oscillator signals. The apparatus uses the data signals and the oscillator signals to develop timing signals that are synchronized with the asynchronous data signals.

3 Claims, 3 Drawing Figures

APPARATUS FOR PRODUCING TIMING SIGNALS THAT ARE SYNCHRONIZED WITH ASYNCHRONOUS DATA SIGNALS

BACKGROUND OF THE INVENTION

This invention relates to apparatus for developing timing signals that are synchronized with asynchronous data signals and more particularly to apparatus which uses the asynchronous data signals to develop the timing signals.

In modern savings banks data processing systems employ bank teller terminals to initiate the updating of the individual customer's account after each transaction. The amount to be deposited or withdrawn is punched into the keyboard of the terminal along with the customer's identifying name or account number. The teller then presses a key which causes the information on the keyboard to be transferred from the terminal, through a communications controller to the central processor of the data processing system. Here the customer's account is updated by adding any interest due to the account and by the amount of the deposit or withdrawal so that a new balance is obtained. The processor then sends the updated amount to the terminal where the updated deposit or withdrawal and the interest is printed on the customer's pass book and account sheet.

The information from the terminal keyboard is transmitted as a series of binary bits over wires between the terminal and other portions of the data processing system. These binary bits may be a combination of binary ones and binary zeros. In order to prevent errors from entering the information which is being transmitted between various parts of the system it is important that each of these binary ones and binary zeros be "read" or sampled near the center of the binary bit, as any noise which may be present in the data processing system has less effect near the center of the binary bits. Thus what is needed is a series of timing pulses which are timed to occur near the center of each of the binary bits. The information from the teller terminal is transmitted as a steady stream of data bits having a transition or change in level when the data changes from a binary one to a binary zero, or from a binary zero to a binary one. When a steady stream of binary ones or a steady stream of binary zeros is transmitted there are no transitions between these bits. Thus, the transitions can not be used to directly develop timing pulses. What is needed is an apparatus which develops timing pulses for each of the binary bits, even when a series of several bits of the same type are transmitted from the teller terminal. It is important that the apparatus develops timing pulses that occur near the center of each of the binary bits.

It is, therefore, an object of this invention to provide apparatus which develops timing signals which are synchronized with asynchronous data signals.

Another object of this invention is to provide apparatus which develops timing signals which are synchronized with data signals from an asynchronous terminal device.

A further object of this invention is to provide timing signals which can be used for sampling data near the center of each data bit of asynchronous data.

Still another object of this invention is to provide apparatus which uses oscillator signals and data signals to develop timing signals which are synchronized with the data signals.

SUMMARY OF THE INVENTION

The foregoing objects are achieved in the present invention by providing apparatus which includes a pair of inverters, a NOR-gate and three up/down counters to develop timing signals that are synchronized with asynchronous data signals.

Other objects and advantages of this invention will become apparent from the following description when taken in connection with the accompanying drawings.

Figure 1:
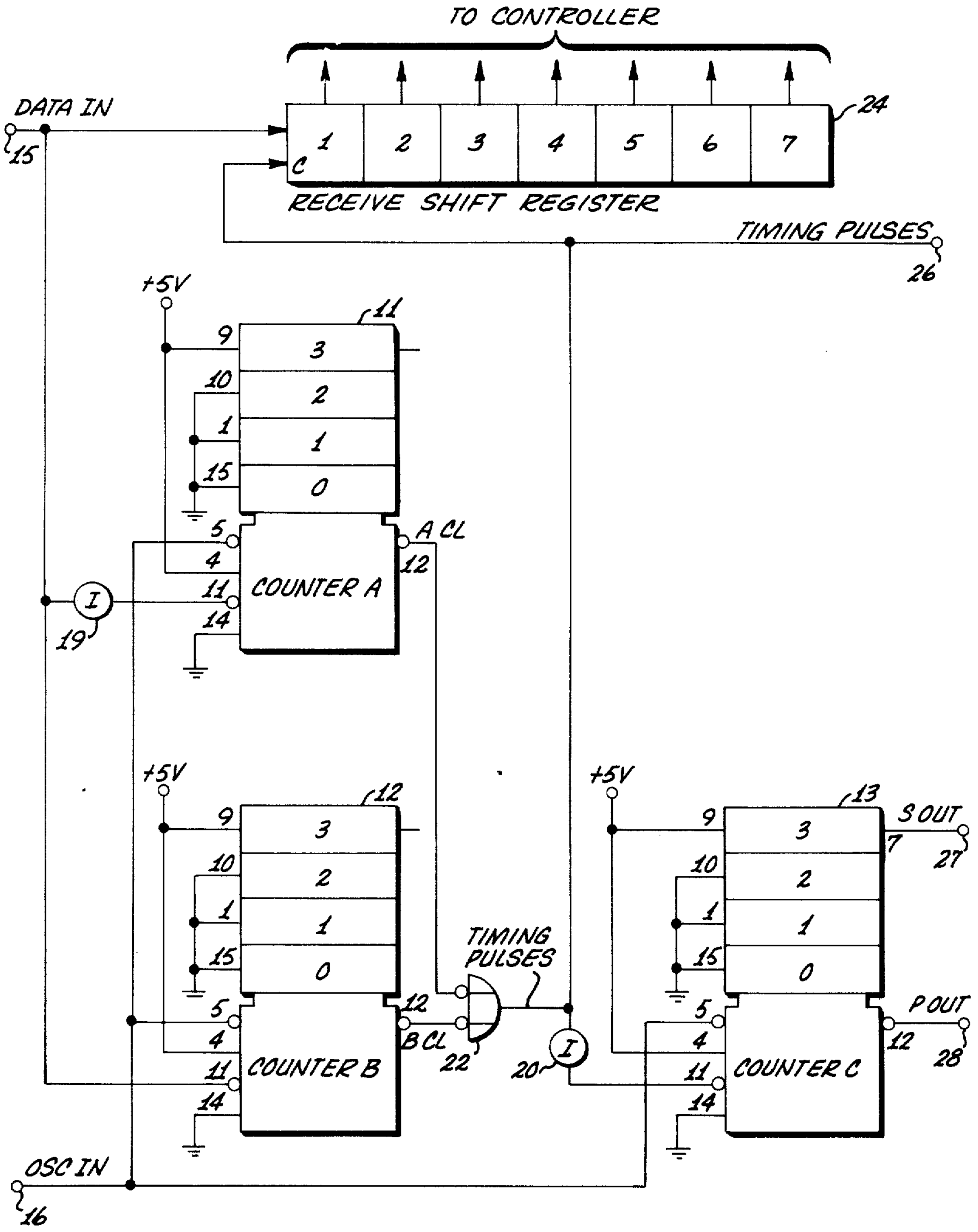
FIG. 1 is a block diagram of one embodiment of the present invention.

FIGS. *2a* and *2b* illustrate waveforms which are useful in explaining the operation of the invention shown in FIG. 1.

DESCRIPTION OF THE PREFERRED EMBODIMENT

The apparatus for producing timing signals that are synchronized with asynchronous data signals shown in FIG. 1 includes a plurality of up/down counters 11–13, a pair of inverters 19 and 20, a NOR-gate 22 and a receive shift register 24. Counters 11–13 are synchronous 4-bit up/down counters such as the manufactures part No. SN74193 which is available from several manufacturers. When a positive voltage is applied to input lead No. 4 of the up/down counter the counter counts only in an upward direction. A positive voltage on the No. 11 input lead of the counter causes the counter to increment one each time a positive pulse is applied to input lead No. 5. The positive voltage on input lead 9 and the ground potential on input leads 1, 10 and 15 force the counter to set and hold at a count of 8 when a low value of voltage is applied to input lead 11. When the counter reaches a count of 15 a negative pulse is developed at the No. 12 output lead which is the carry output lead. On a count of 8 the number 7 output lead goes positive and on a count of 0 the No. 7 output lead assumes a low value of output voltage. Other details of the operation of this counter may be found in "The Integrated Circuit Catalog for Design Engineers", 1st Edition, by Texas Instruments, Dallas, Texas.

The inverters 19 and 20 each provide the logical operation of inversion for an input signal applied thereto. The inverter provides a positive output signal representing a binary one when the input signal applied thereto has a low value representing a binary zero. Conversely, the inverter provides an output signal representing a binary zero when the input signal represents a binary one. The NOR-gate 22 provides an output signal representing a binary one when either or both of the input signals represent a binary zero. When both of the input signals applied thereto represent a binary one the output signal represents a binary zerc.

The receive shift register 24 of FIG. 1 is used to store data characters consisting of 7 binary bits. When the first binary bit is received on the data input terminal 15 this bit is shifted into the first storage compartment of the shift register 24 by a positive signal pulse on the C input lead of the shift register. When the next pulse is received on the C input lead the data which was in the first storage compartment is shifted into the second storage compartment and the data which is then present on the data input terminal is put into the storage compartment No. 1. This continues until the entire character has been moved in to shift register 24. At this time the complete character can be read from the output leads and moved into another part of the data processing system (not shown). Details of the operation of the shift register 24 may be found in the textbook "Digital Computer Fundamentals", 2nd Edition, by Thomas C. Bartee, McGraw-Hill Book Company, New York, 1966.

Figure 2A:
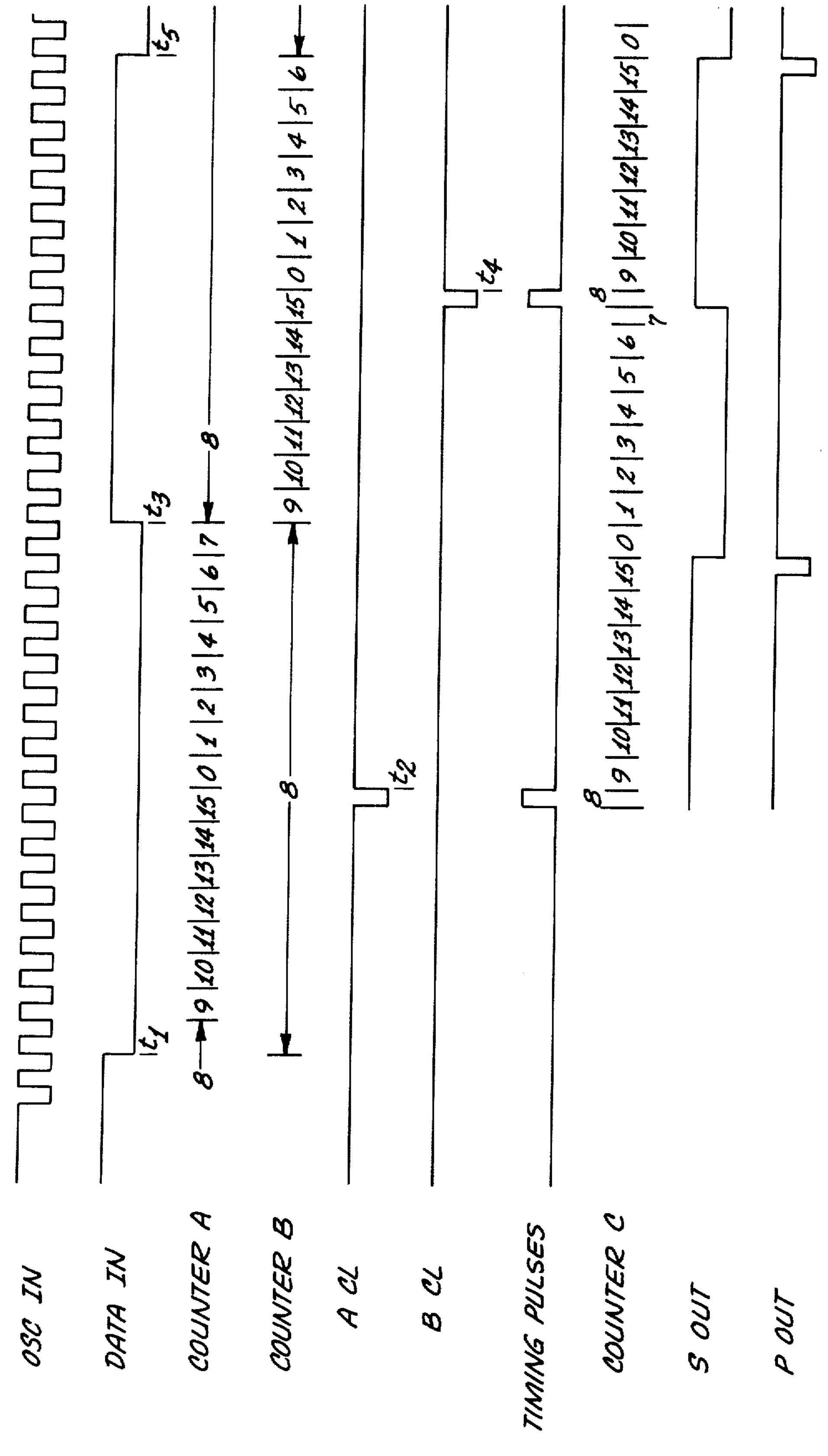
Figure 2B:
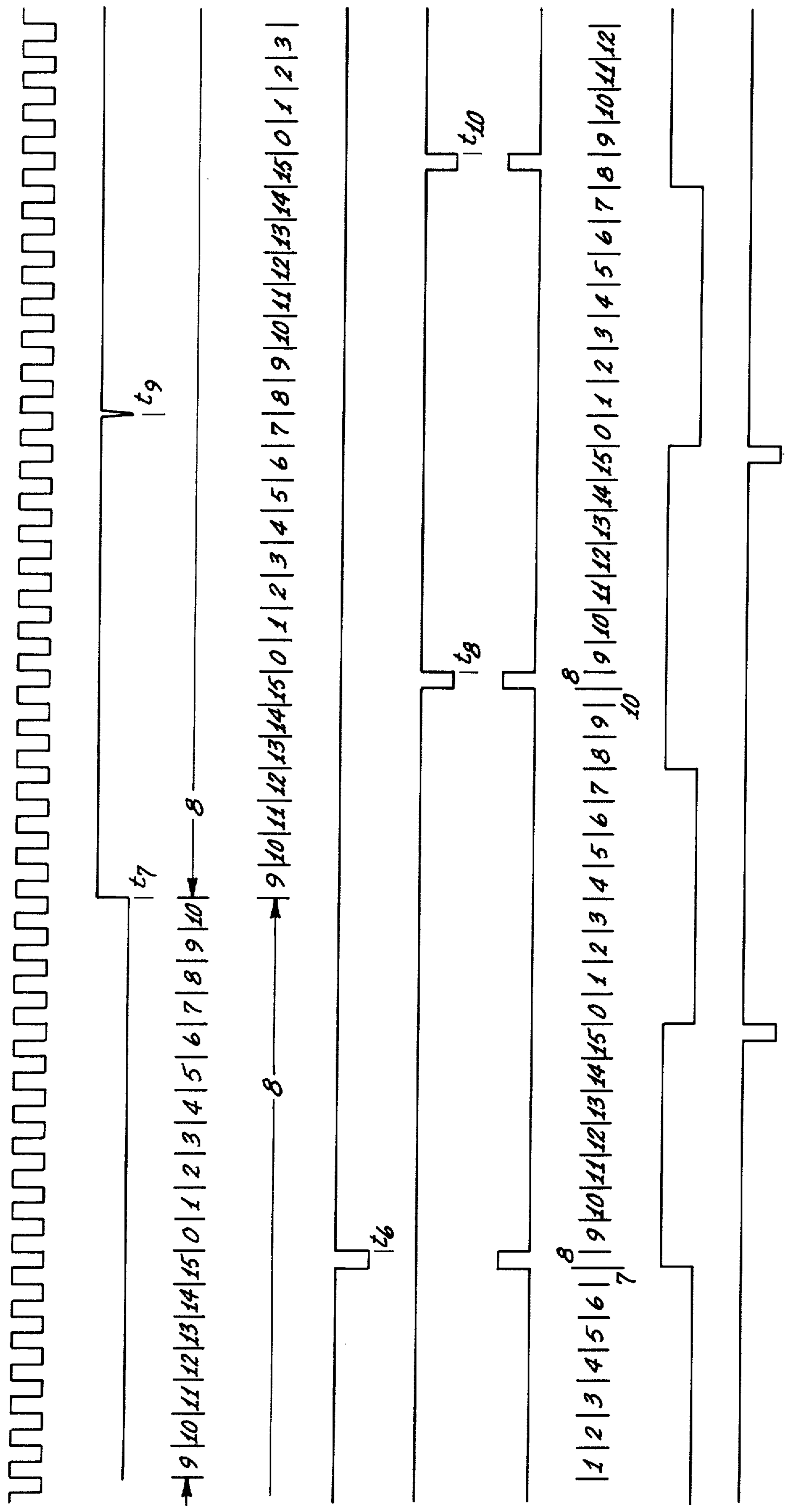

The operation of the apparatus for producing timing signals shown in FIG. 1 will now be described in connection with the waveform shown in FIGS. 2*a* and 2*b*. FIGS. 2*a* and 2*b* are drawn to be placed side by side with the waveforms from the right side of FIG. 2*a* extending to the left side of FIG. 2*b*. A short portion of the waveforms at the right of FIG. 2*a* is repeated at the left of FIG. 2*b*. The oscillator signals shown in the upper waveform of FIG. 2 are applied to the oscillator input terminal 16 and the data signals are applied to the data input terminal 15 of FIG. 1. In the illustrated embodiment the frequency of the oscillator pulses is approximately 16 times the frequency of the data input signals. The ratio of the frequency of the oscillator signals to the data signals is not critical and it should be understood that any ratio can be used although a relatively high oscillator to data input signal ratio provides more accurate centering of the timing pulses which are developed by the circuit of FIG. 1.

In the circuit shown in FIG. 1 counter B develops timing pulses during the time that a positive data signal is received at the input terminal 15 and counter A develops the timing pulses during the time that a low value of data signal is received at input terminal 15. The outputs of the two counters are then gated through the NOR-gate 22 so that the output of the OR-gate has the timing pulses coupled to output terminal 26 when either a positive signal or a low value of signal is received at data input terminal 15. Prior to time t1 of FIG. 2 the positive data signal on terminal 15 is inverted by inverter 19 causing counter A to be locked at a count of 8. During this same time counter B is counting with the count immediately prior to t1 being determined by the time duration of the positive pulse prior to time t1. At time t1 counter B is reset to a count of 8 by the low value of data input voltage and counter A starts counting upward from a count of 8. When counter A reaches a count of 15 at time *t*2 a pulse from the output lead 12 is coupled through the NOR-gate 22 to output terminal 26 and to the receive shift register 24, thereby causing the gated bit on terminal 15 to be entered into the first storage compartment of shift register 24. Counter A continues to count in a normal manner until time *t*3 at which time the incoming data goes positive thereby causing the counter A to be reset and held at a count of 8. Between times *t*1 and *t*3 the data input signal is exactly the proper length to be synchronized with the oscillator input signal.

At time *t*3 counter B starts counting in a normal manner with a count of 9 and continues counting until time *t*5. Since the data signal between time *t*3 and *t*5 is shorter than the normal data signal, the counter B is reset before the count gets to 8 and counter A starts counting with a count of 9 at the next pulse following time *t*5. Thus, when the data signals are shorter than normal the counter is reset so that the count still provides a pulse at the count of 15 near the center of the following data bit.

The data signal between *t*5 and *t*7 is longer than the normal data signal. FIG. 2*b* shows how the pulse generator is synchronized when the duration of the data signal is longer than normal. Immediately prior to time *t*7 counter A has counted to a count of 10 which is beyond the normal count of 8 which would be expected at the time when the data signal would normally go in a positive direction. At time *t*7 counter A is reset to a count of 8 and counter B starts counting at a count of 9. At a count of 15 the B counter supplies an output pulse as shown at time *t*8. Again the output timing pulse at time *t*8 is near the center of the positive data signal or binary one which is between times *t*7 and *t*9. The data between time *t*7 and *t*9 represents a binary one with another binary one following at time *t*9. Thus the timing pulses at the output terminal 26 may be used to shift the binary ones and zeros into the shift register during the middle of each of the binary bits where the chances for noise causing errors in the data is greatly reduced.

When it is desired to provide a squarewave which is synchronized with the incoming data the signals from the output lead of the NOR-gate 22 may be coupled through inverter 20 to input lead 11 of counter C. The signals on input lead 11 of counter C cause the counter to develop square waves on output lead 7 as shown in the S out waveform of FIGS. 2*a* and 2*b*. The signals on input lead 11 of counter C cause the counter to provide the timing pulses on the output lead 12 as shown in the P out of terminal 28. The pulses from the output terminal 28 are delayed so that they occur between the timing pulses produced at terminal 26. Thus, the circuit shown in FIG. 1 produces timing signals which are synchronized with the asynchronous data which is received on the input terminal 15.

While the principles of the invention have now been made clear in an illustrative embodiment, there will be many obvious modifications of the structure, proportions, materials and components without departing from those principles. The appended claims are intended to cover any such modifications.

I claim:

1. Apparatus for producing timing signals that are synchronized with asynchronous data signals, for use with a source of data and a source of oscillator signals, said apparatus comprising:

first and second up/down counters each having first and second input leads and an output lead, said first input lead of said first counter being connected to said source of data, said source of oscillator signals being connected to said second input leads of said first and said second counters;

an inverter, said inverter being connected between said source of data and said first input lead of said second counter;

a logic gate having first and second input leads and an output lead, said first input lead of said gate being connected to said output lead of said first counter, said second input lead of said gate being connected to said output lead of said second counter; and a shift register having first and second input leads and a plurality of output leads, said first input lead of said register being connected to said source of data, said second input lead of said register being connected to said output lead of said gate.

2. Apparatus for producing timing signals as defined in claim 1 including:

a third up/down counter having first and second input leads and first and second output leads, said first input lead of said third counter being connected to said output lead of said logic gate.

3. Apparatus for producing timing signals that are synchronized with asynchronous data signals, for use with a source of data and a source of oscillator signals, said apparatus comprising:

first, second and third up/down counters each having first and second input leads and first and second output leads, said first input lead of said first counter being connected to said source of data, said source of oscillator signals being connected to said second input leads of said first, said second and said third counters;

first and second inverters, said first inverter being connected between said source of data and said first input lead of said second counter;

an OR-gate having first and second input leads and an output lead, said first input lead of said OR-gate being connected to said first output lead of said first counter, said second input lead of said OR-gate being connected to said first output lead of said second counter, said second inverter being connected between said output lead of said OR-gate and said first input lead of said third counter;

a shift register having first and second input leads and a plurality of output leads, said first input lead of said register being connected to said source of data, said second input lead of said register being connected to said output lead of said OR-gate; and first and second output terminals, said first output terminal being connected to said first output lead of said third counter, said second output terminal being connected to said second output lead of said third counter.

* * * * *